(12) United States Patent  (10) Patent No.: US 11,073,197 B2
Gassner  (45) Date of Patent: Jul. 27, 2021

(54) DRIVING BLOCK, LINEAR ACTUATOR AND ADJUSTING APPARATUS

(71) Applicant: LIMOSS (DONGGUAN) CO., LTD., Guangdong (CN)

(72) Inventor: Christian Gassner, Guangdong (CN)

(73) Assignee: LIMOSS (DONGGUAN) CO., LTD., Guangdong (CN)

( * ) Notice: Subject to any disclaimer, the term of this patent is extended or adjusted under 35 U.S.C. 154(b) by 121 days.

(21) Appl. No.: 16/681,828

(22) Filed: Nov. 13, 2019

(65) Prior Publication Data

US 2020/0124148 A1 Apr. 23, 2020

Related U.S. Application Data

(63) Continuation of application No. PCT/CN2018/110681, filed on Oct. 17, 2018.

(51) Int. Cl.
*F16H 25/24* (2006.01)
*F16H 25/20* (2006.01)

(52) U.S. Cl.
CPC ............. *F16H 25/24* (2013.01); *F16H 25/20* (2013.01)

(58) Field of Classification Search
CPC ........... F16H 25/24; F16H 25/20; B60N 2/06; B60N 2/07
See application file for complete search history.

(56) References Cited

U.S. PATENT DOCUMENTS 3,670,583 A * 6/1972 Leming ............... F16H 25/2261
 74/89.36
5,373,751 A * 12/1994 Katahira ................. F16H 25/20
 108/143
5,816,555 A * 10/1998 Ito .......................... B60N 2/067
 248/429

(Continued)

FOREIGN PATENT DOCUMENTS

CN 1121272 4/1996
CN 101636600 1/2010

(Continued)

OTHER PUBLICATIONS

"International Search Report (Form PCT/ISA/210) of PCT/CN2018/110681," dated Jul. 5, 2019, pp. 1-4.

(Continued)

*Primary Examiner* — David M Fenstermacher
(74) *Attorney, Agent, or Firm* — JCIPRNET

(57) ABSTRACT

A driving block, a linear actuator and an adjusting apparatus are provided. The adjusting apparatus comprises an executing mechanism and a linear actuator. The linear actuator comprises a driving block and a spindle. The driving block comprises a base, a changeover unit, a fastener and a limit unit. The base is in transmission connection with the spindle. The changeover unit includes a first mounting portion, a second mounting portion and a connecting portion. The first mounting portion and the second mounting portion are oppositely disposed on the base and are both connected with connecting portion. The first mounting portion and the second mounting portion are connected to the base by the fastener. The connecting portion is engaged with the executing mechanism, and the limit unit is used to restrict movement of the changeover unit relative to the base.

20 Claims, 11 Drawing Sheets

(56) References Cited

U.S. PATENT DOCUMENTS

| | | | | |
|---|---|---|---|---|
| 6,244,122 B1* | 6/2001 | Hsu | ............ | B23Q 5/408 74/89.23 |
| 2002/0066327 A1* | 6/2002 | Nagai | ............ | F16H 25/20 74/89.33 |
| 2008/0257080 A1* | 10/2008 | Singh | ............ | F16H 57/01 74/89.23 |
| 2009/0199667 A1 | 8/2009 | Menjak et al. | | |
| 2012/0169099 A1* | 7/2012 | Horiguchi | ............ | B60N 2/307 297/314 |
| 2016/0116033 A1* | 4/2016 | Yamakura | ............ | F16C 29/063 74/424.89 |
| 2017/0001541 A1* | 1/2017 | Mixon | ............ | B60N 2/0232 |
| 2017/0334314 A1* | 11/2017 | Takada | ............ | B60N 2/1635 |
| 2019/0100118 A1* | 4/2019 | Rey | ............ | F16H 25/20 |
| 2019/0107186 A1* | 4/2019 | Feitl | ............ | F16D 1/092 |
| 2019/0135138 A1* | 5/2019 | Duhamel | ............ | B60N 2/0232 |
| 2019/0168640 A1* | 6/2019 | Kapusky | ............ | B60N 2/0825 |
| 2019/0226563 A1* | 7/2019 | Hatasako | ............ | F16H 25/2009 |
| 2020/0172383 A1* | 6/2020 | Garrec | ............ | F16H 19/0622 |
| 2020/0282868 A1* | 9/2020 | Komiyama | ............ | B60N 2/0232 |
| 2021/0010590 A1* | 1/2021 | Cho | ............ | F16H 63/16 |
| 2021/0123490 A1* | 4/2021 | Jo | ............ | F16H 25/20 |

FOREIGN PATENT DOCUMENTS

| | | |
|---|---|---|
| CN | 203230825 | 10/2013 |
| CN | 103795180 | 5/2014 |
| CN | 205319852 | 6/2016 |
| CN | 205480073 | 8/2016 |
| CN | 205647230 | 10/2016 |
| WO | 2015116871 | 8/2015 |

OTHER PUBLICATIONS

"Office Action of China Counterpart Application", dated Nov. 12, 2020, p. 1-p. 7.

* cited by examiner

DRIVING BLOCK, LINEAR ACTUATOR AND ADJUSTING APPARATUS

CROSS-REFERENCE TO RELATED APPLICATION

This application is a continuation of international PCT application Serial No. PCT/CN2018/110681 filed on Oct. 17, 2018. The entirety of the above-mentioned patent application is hereby incorporated by reference herein and made a part of this specification.

BACKGROUND

Technical Field

The present application relates to the field of driving block, linear actuator and adjusting apparatus.

Description of Related Art

Linear actuators are a kind of actuators used to generate linear motion, which are mainly used in adjusting apparatus such as sofa, chair, medical bed, etc. The linear actuator mainly comprises a motor, a transmission-mechanism and a driving block. The transmission-mechanism can convert the rotational motion of the motor into the linear motion of the driving block. At the same time as the driving block moves, it can drive the executing mechanism connected with it to adjust the height or other attitude of the adjusting apparatus.

Generally, the driving block is a one-piece structure. One type of the driving block is only suitable for one type of the actuator. When connecting different executing mechanisms, different types of driving blocks need to be produced, which will increase the production cost.

SUMMARY

Various embodiments of the present application provide a driving block, a linear actuator and an adjusting apparatus. The driving block comprises a base, a changeover unit, a fastener, and a limit unit.

The base is in transmission connection with a spindle. The changeover unit comprises a first mounting portion, a second mounting portion and a connecting portion. The first mounting portion and the second mounting portion are disposed on the base and both connected to the connecting portion. The connecting portion is engaged with an executing mechanism. The first mounting portion and the second mounting portion are connected to the base by the fastener. The limit unit is used to restrict movement of the changeover unit relative to the base.

A linear actuator comprises the spindle and the driving block which is mentioned above.

An adjusting apparatus comprises executing mechanism and the linear actuator which is mentioned above.

Beneficial Effect

Beneficial effect of the embodiment in the present application comprises: in the driving block of the embodiment, the changeover unit is detachable from the base. Corresponding to different types of the executing mechanisms, just replace with appropriate changeover unit. Therefore, in the production stage, it can reduce the manufacturing cost of the base, such as material cost, labor cost and so on, thus reduce the manufacturing cost of the driving block. Moreover, if the base or the changeover unit is damaged during use, just replace the broken parts, thereby reducing maintenance cost.

In addition, when changing the changeover unit, just remove the fastener, the operation is more convenient and fast, comparing with the spindle separated from the traditional integral driving block. The application of the above driving block on the linear actuator can reduce the production cost and maintenance cost of the linear actuator, and then reduce the production cost and maintenance cost of the adjusting apparatus.

BRIEF DESCRIPTION OF THE DRAWINGS

In order to clearly describe the embodiments of the present application or the technical scheme of the prior art, the following is a brief description of the drawings used in the embodiments or in the description of the prior art. Obviously, the drawings in the following description are only some embodiments of the present application, and other drawings may be obtained from these drawings without any creative effort on the part of the ordinary technical personnel in the field.

DESCRIPTION OF THE EMBODIMENTS

In order to illustrate the purpose, technical solutions and the advantages of the present application more clearly, the present application will be described below in further details with reference to the drawings and embodiments. It is to be understood that specific embodiments described herein are merely for explaining, instead of limiting the present application.

Figure 1:
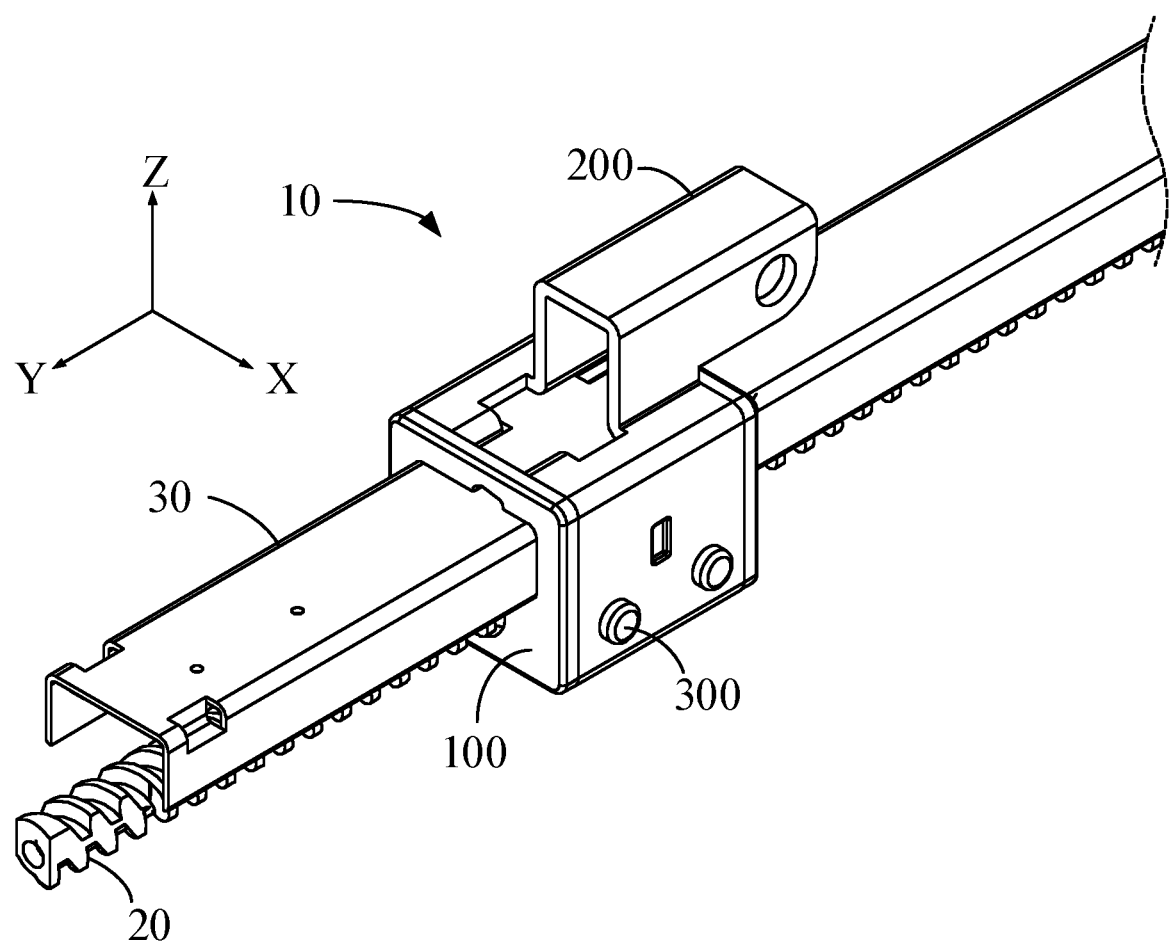
FIG. 1 is a partial structural view of an embodiment of a linear actuator in a forward assembly state.
Figure 3:
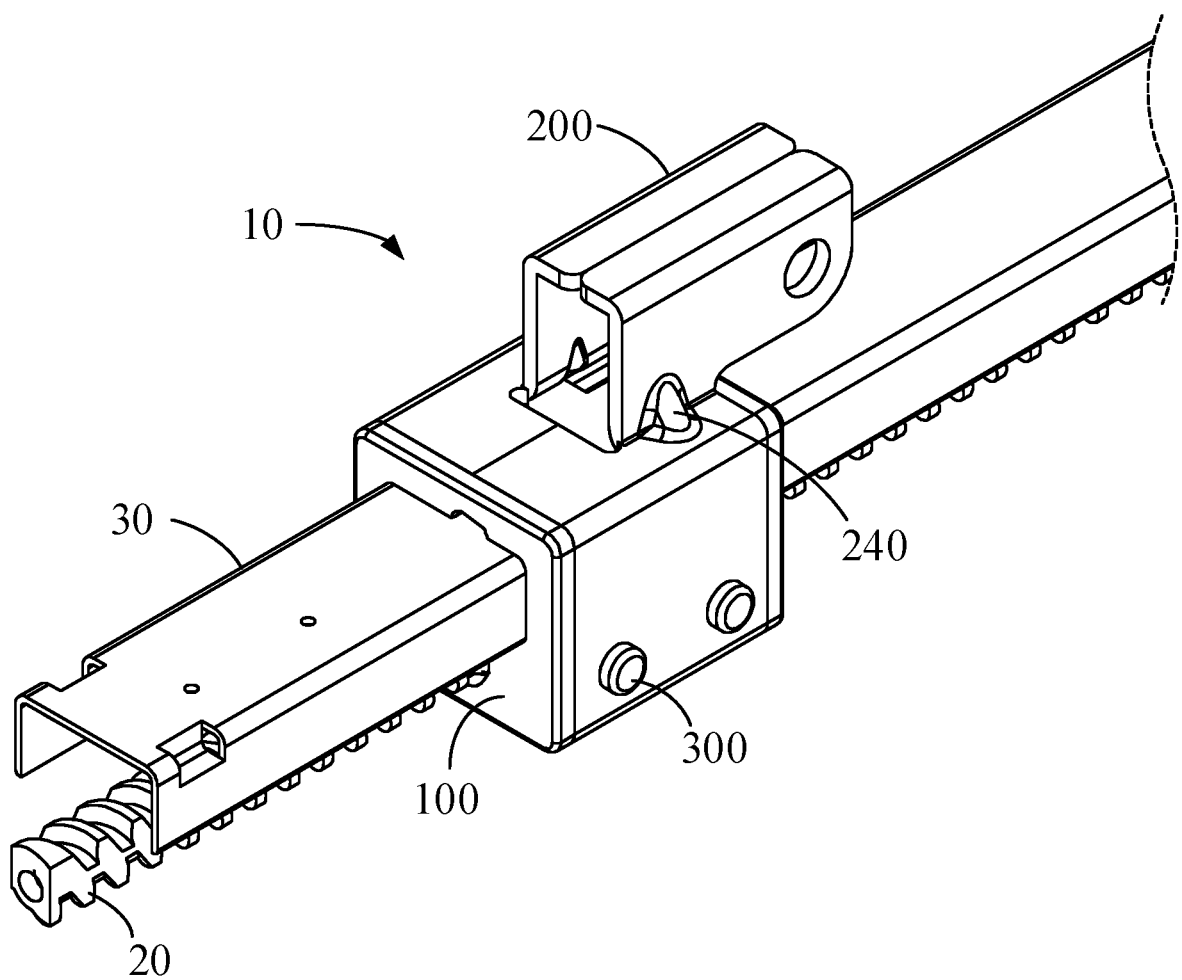
FIG. 3 is a partial structural view of another embodiment of a linear actuator in the forward assembly state.

Referring to FIG. 1 and FIG. 3, one embodiment of a linear actuator comprises a motor, a driving block 10, a spindle 20 with external thread, and a guide rail 30. The driving block 10 is slidably disposed on the guide rail 30. The spindle 20 is driven by the motor and can rotate synchronously with the motor. When the spindle 20 rotates, the driving block 10 can move along the guide rail 30 with an axial direction of the spindle 20. The guide rail 30 can not only guide the movement of the driving block 10, but also enhance the stability of the driving block 10 when it moves.

The linear actuator of the embodiment can be applied to adjusting apparatus, such as sofa, chair, medical bed, etc. The driving block 10 is connected to an executing mechanism of the adjusting apparatus. As the driving block 10 moves, the executing mechanism is driven to move, in order to achieve adjustment of the adjusting apparatus. The adjusting apparatus also can comprise a linkage unit, which is used for an executive mechanism moves in the axial direction of the spindle 20 along with the driving block 10. In an alternative embodiment, the executive mechanism is connected with the driving block 10 by the linkage unit such as scissor hands. The executing mechanism can be lifted and lowered when the driving block 10 moves.

Figure 6:
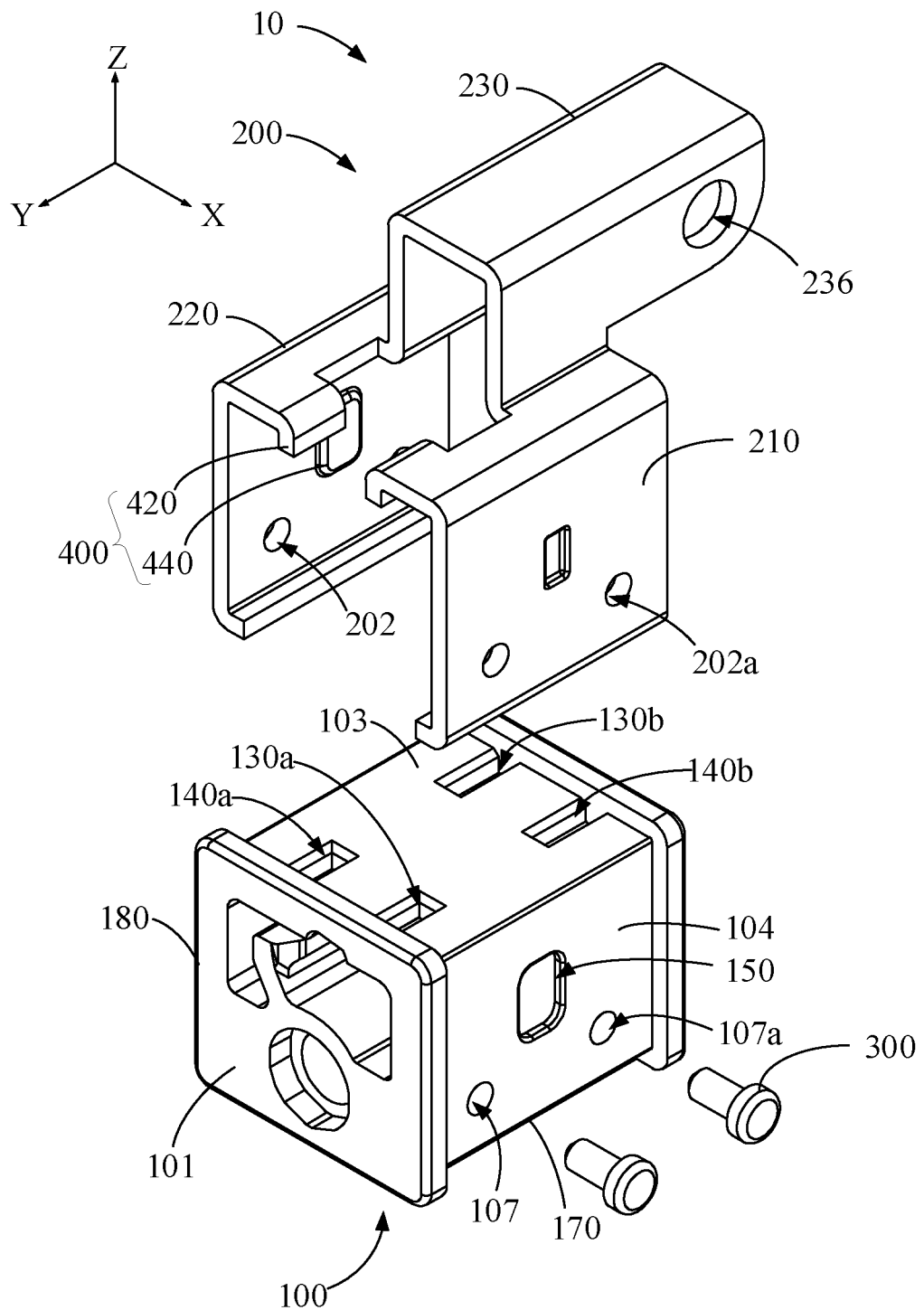
FIG. 6 is an exploded structural view of the driving block as shown in FIG. 5.

Referring to FIG. 1 and FIG. 6, the driving block 10 comprises a base 100, a changeover unit 200, a fastener 300 and a limit unit 400. The base 100 is assembled on the spindle 20 and guide rail 30. The changeover unit 200 is used to connect with linkage unit, and is in detachable connection to the base 100 by the fastener 300. The limit unit is used to restrict movement of the changeover unit 200 relative to the base 100, in order to enhance the stability of the integral driving block 10. An alternative embodiment of the driving block 10, the changeover unit 200 is detachable from the base 100, corresponding to different types of the executing mechanisms, replace with appropriate changeover unit 200. Therefore, in the production stage, the manufacturing cost of the base 100 is reduced, such as material cost, labor cost and so on, thus the manufacturing cost of the driving block 10 is also reduced. Moreover, if the base 100 or the changeover unit 200 is damaged, just replace the broken parts, thereby reducing maintenance cost. In addition, when changing the changeover unit, just remove the fastener, the operation is more convenient and fast, comparing with the spindle separated from the traditional integral driving block.

Figure 5:
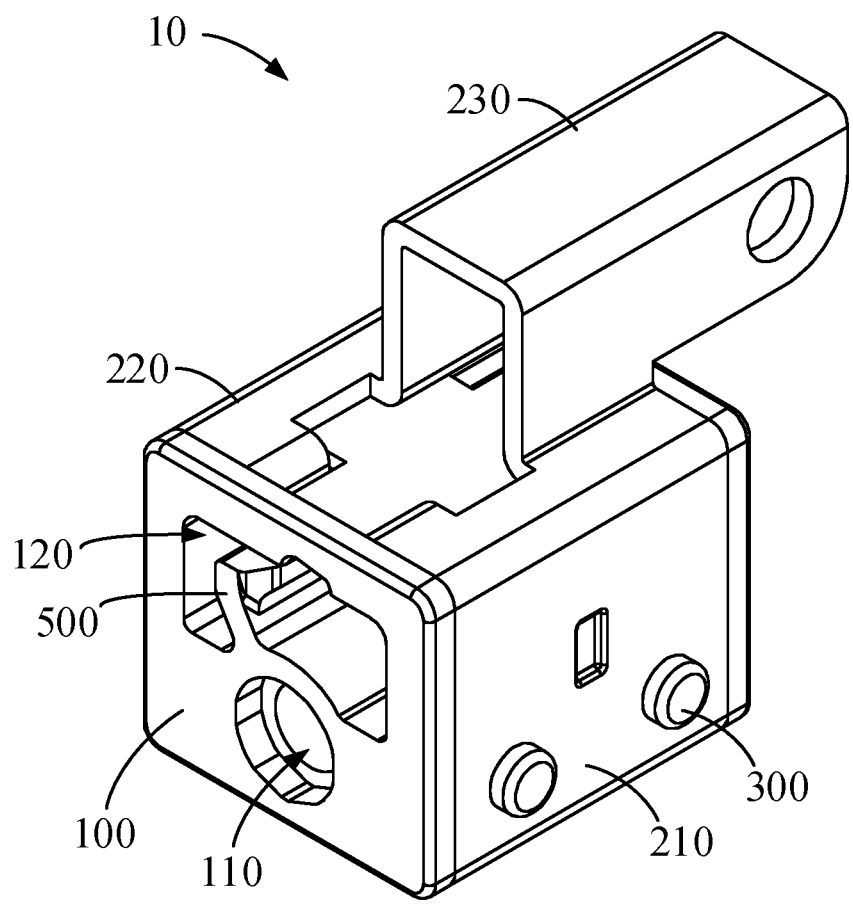
FIG. 5 is a structural view of a driving block in the linear actuator as shown in FIG. 1.
Figure 10:
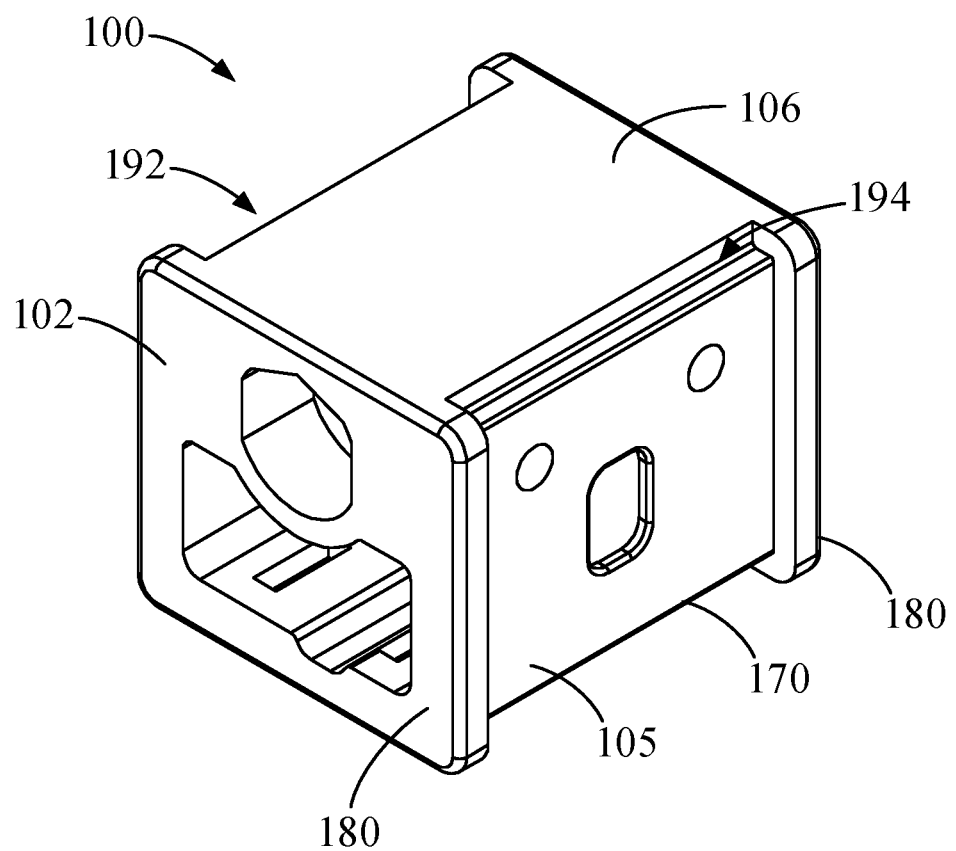
FIG. 10 is an alternative structural view of a base of the driving block as shown in FIG. 5.

Specifically, referring to FIG. 5, FIG. 6 and FIG. 10, the base 100 is roughly rectangular, comprising a first end surface 101, a second end surface 102, a first side plate 103, a second side plate 104, a third side plate 105 and a forth side plate 106. The first end surface 101 and the second end surface 102 are correspondingly disposed. The first side plate 103 and the forth side plate 106 are correspondingly disposed. The second side plate 104 and the third side plate 105 are correspondingly disposed. The base 100 is provided with a connection hole 110 and a plug hole 120. An inner wall of the connection hole 110 is provided with internal thread. Both of the connection hole 110 and the plug hole 120 run through from the first end surface 101 to the second end surface 102. The spindle 20 is perforated in the connection hole 110, and in transmission connection with the base 100. The guide rail 30 is perforated in the plug hole 120. The first side plate 103, the second side plate 104, the third side plate 105 and the forth side plate 106 are all parallel to an axis of the spindle 20.

In one embodiment, the connection hole 110 is isolated from the plug hole 120. Referring to FIG. 5, the connection hole 110 is located below the plug hole 120, and this structural design can enhance the bearing capacity of the base 100. Understandably, in an alternative embodiment, the connection hole 110 can also be set inside the plug hole 120.

Deserve to be mentioned, in this embodiment, the base 100 is an integral structure, so as to simplify the manufacturing process of the driving block 10 and improve the production efficiency of the driving block 10.

Figure 7:
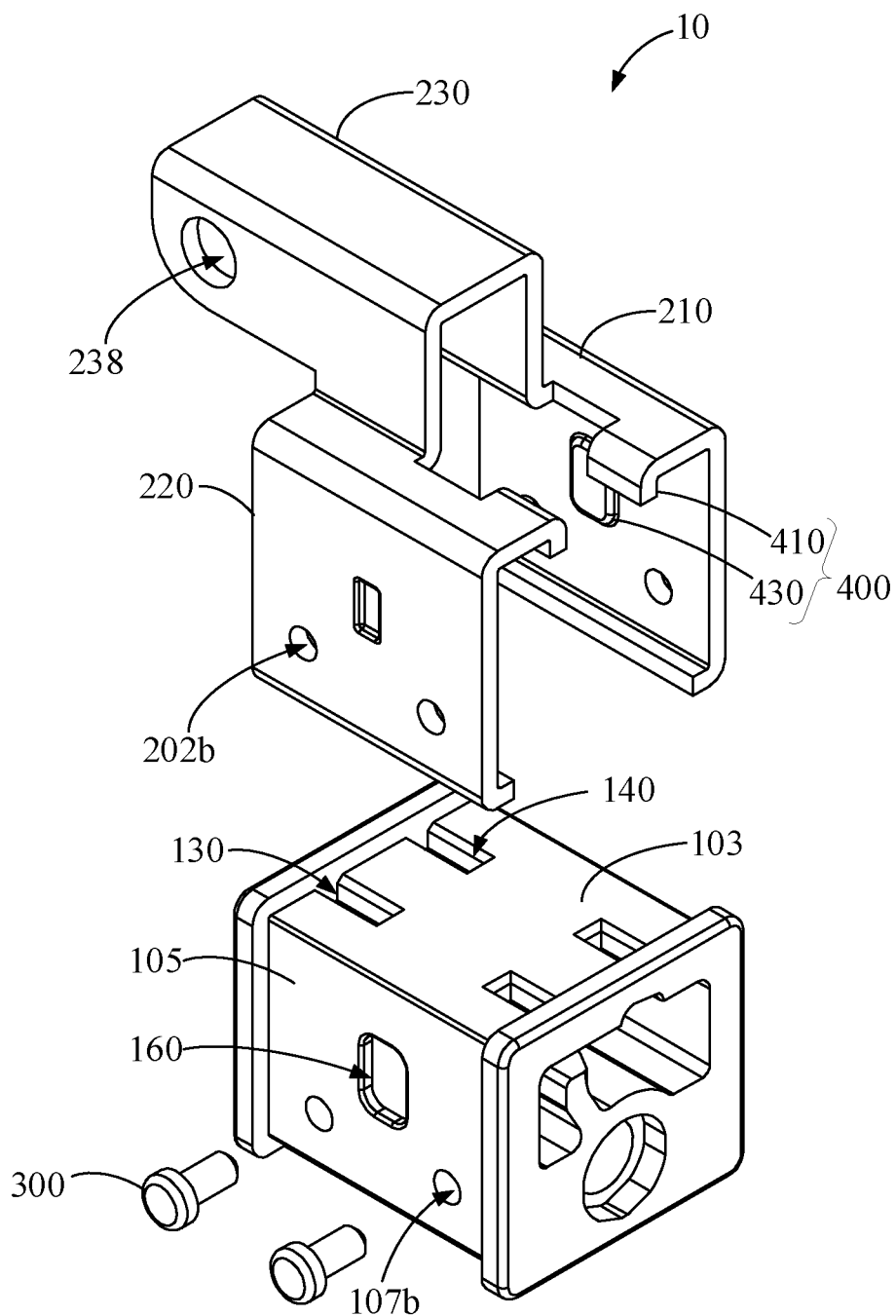
FIG. 7 is an alternative exploded structural view of the driving block as shown in FIG. 5.
Figure 8:
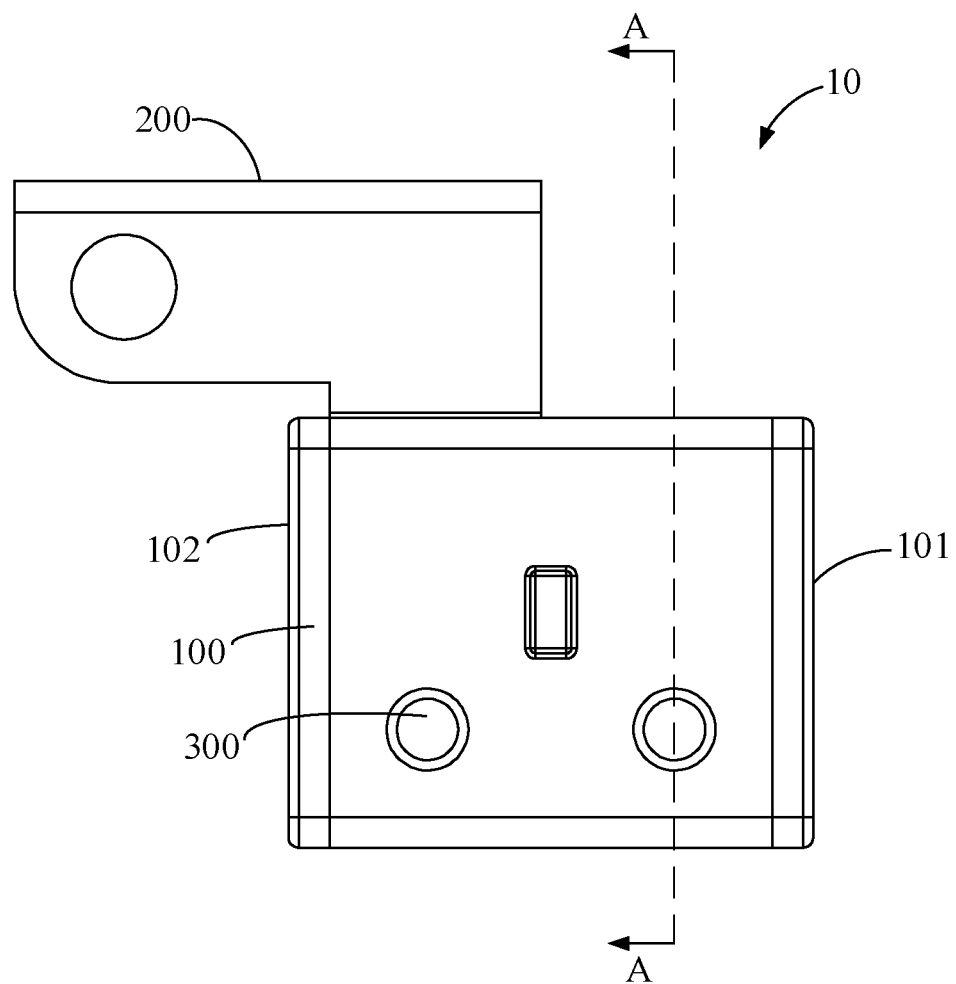
FIG. 8 is a left view of the driving block as shown in FIG. 5.

Referring to FIG. 6 and FIG. 7, the changeover unit 200 is provided with a first fixing hole 202, the base 100 is provided with a second fixing hole 107, the second fixing hole 107 is opposite to the first fixing hole 202, and the fastener 300 is inserted into the first fixing hole 202 and the second fixing hole 107.

Specifically, the changeover unit 200 comprises a first mounting portion 210, a second mounting portion 220 and a connecting portion 230. The first mounting portion 210 and the second mounting portion 220 are oppositely disposed on the base 100 and both connected to the connecting portion 230. The connecting portion 230 is engaged with the executing mechanism.

The first mounting portion 210 and the second mounting portion 220 are connected to the base 100 by the fastener 300. The fastener 300 can be equipped with multiple. Specific to this embodiment, the first mounting portion 210 is provided with a first fixing hole 202*a*, and the second side plate 104 is provided with a second fixing hole 107*a* which is directly opposite to the first fixing hole 202*a*. The fastener 300 is inserted into the first fixing hole 202*a* and the second fixing hole 107*a* to connect the first mounting portion 210 to the base 100. The second mounting portion 220 is provided with a first fixing hole 202*b*, and the third side plate 105 is provided with a second fixing hole 107*b* which is directly opposite to the first fixing hole 202*b*. The fastener 300 is inserted into the first fixing hole 202*b* and the second fixing hole 107*b* to connect the second mounting portion 220 to the base 100. Understandably, in other embodiments, it is also possible to connect the base 100 and connecting portion 230 by the fastener 300.

The connecting portion 230 is provided with a first stepping hole 236 and a second stepping hole 238, the first stepping hole 236 is oppositely defined to the second stepping hole 238, in other words, an axis of the first stepping hole 236 coincides with an axis of the second stepping hole 238, and both the first stepping hole 236 and the second stepping hole 238 are provided to connect with the linkage unit.

In one embodiment, referring to FIG. 6, the connecting portion 230 is an integral structure, and is formed into one-piece respectively with the first mounting portion 210 and the second mounting portion 220. In other words, the changeover unit 200 is an integral structure, which can enhance its own structural strength, further simplify the manufacturing process of the driving block 10, and improve the production efficiency of the driving block 10. In addition, the connecting portion 230 is an integral structure, which can also reduce the coaxiality error of the first stepping hole 236 and the second stepping hole 238, and improve the connecting stability between the linkage unit and the driving block 10, so as to make the driving block 10 move more smoothly.

Figure 11:
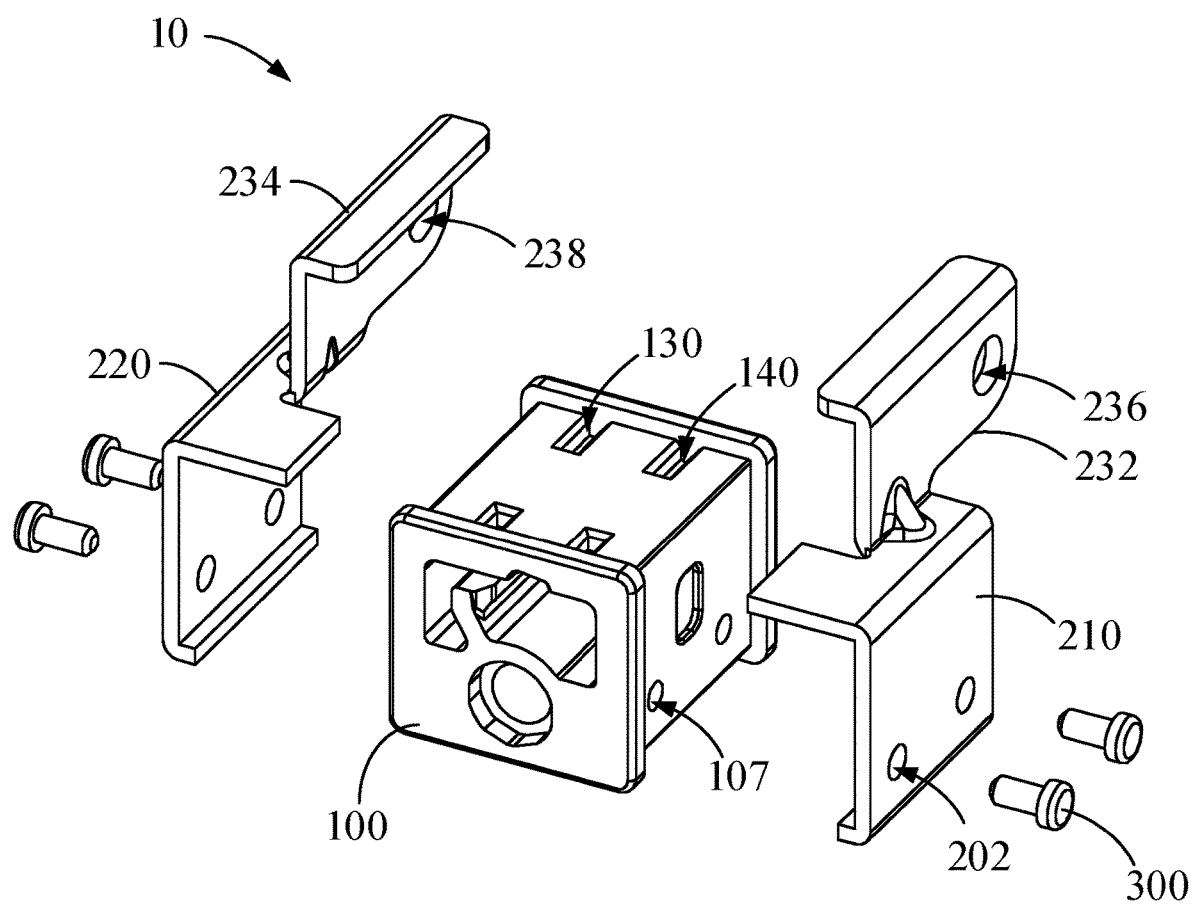
FIG. 11 is an exploded structural view of the driving block of the linear actuator as shown in FIG. 3.

In one embodiment, referring to FIG. 11, the connecting portion 230 is a split type structure, and comprises a first connecting component 232 and a second connecting component 234 that are oppositely disposed with each other. The first connecting component 232 and the second connecting component 234 are separate from each other. The first connecting component 232 is integrated with the first mounting portion 210 to form a first connecting subassembly, and the second connecting component 234 is integrated with the second mounting portion 220 to form a second connecting subassembly. If the first connecting subassembly is damaged, only replace the first connecting subassembly. If the second connecting subassembly is damaged, only replace the second connecting subassembly, which can further reduce the maintenance cost.

Figure 4:
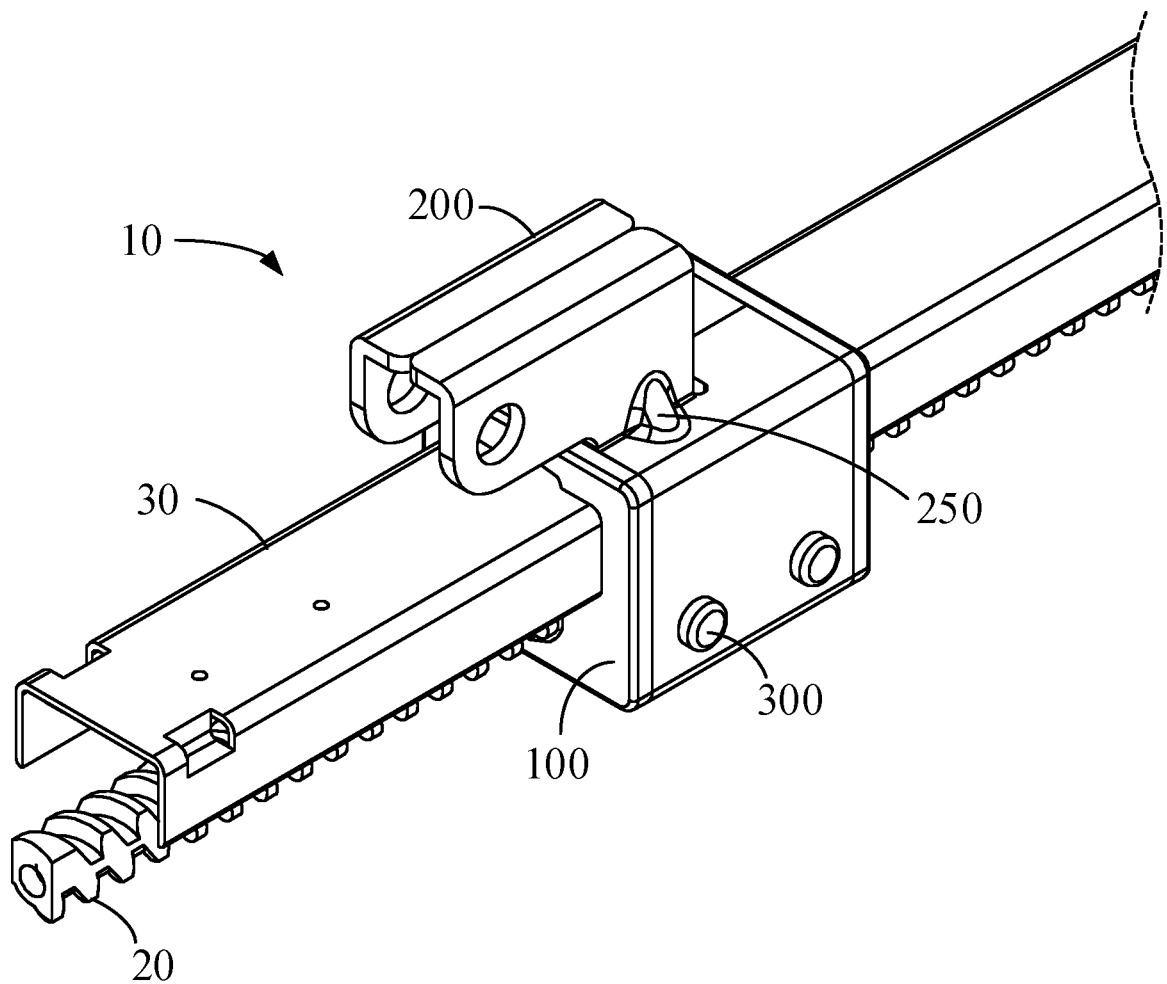
FIG. 4 is a partial structural view of the linear actuator as shown in FIG. 3 in an opposite state.

In one embodiment, referring to FIG. 11, the first stepping hole 236 is defined on the first connecting component 232, and the second stepping hole 238 is defined on the second connecting component 234. Referring to FIG. 3 and FIG. 4, the changeover unit 200 also comprises a first stiffener 240 and a second stiffener 250. The first stiffener 240 is used to connect the first mounting portion 210 and the first connecting component 232, in order to enhance the structural strength of the first connecting subassembly. The second stiffener 250 is used to connect the second mounting portion 220 and the second connecting component 234, in order to enhance the structural strength of the second connecting subassembly.

Referring to FIG. 1, FIG. 6 and FIG. 7, the first side plate 103 is provided with at least one first groove 130 and at least one second groove 140. The limit unit 400 comprises a first snap member 410 and a second snap member 420, and the first snap member 410 is connected with the first mounting portion 210, and is inserted in the first groove 130. The second snap member 420 is connected with the second mounting portion 220, and is inserted in the second groove 140. The matching between the first snap member 410 and the first groove 130 and the matching between the second snap member 420 and the second groove 140 can restrict the movement of the changeover unit 200 relative to the base 100 in a plane formed by X and Y axes, where the Y axis is parallel to the axis of the spindle 20. Definitely, the position of the first groove 130 is interchangeable with that of the first snap member 410, and the position of the second groove 140 is interchangeable with that of the second snap member 420.

Figure 2:
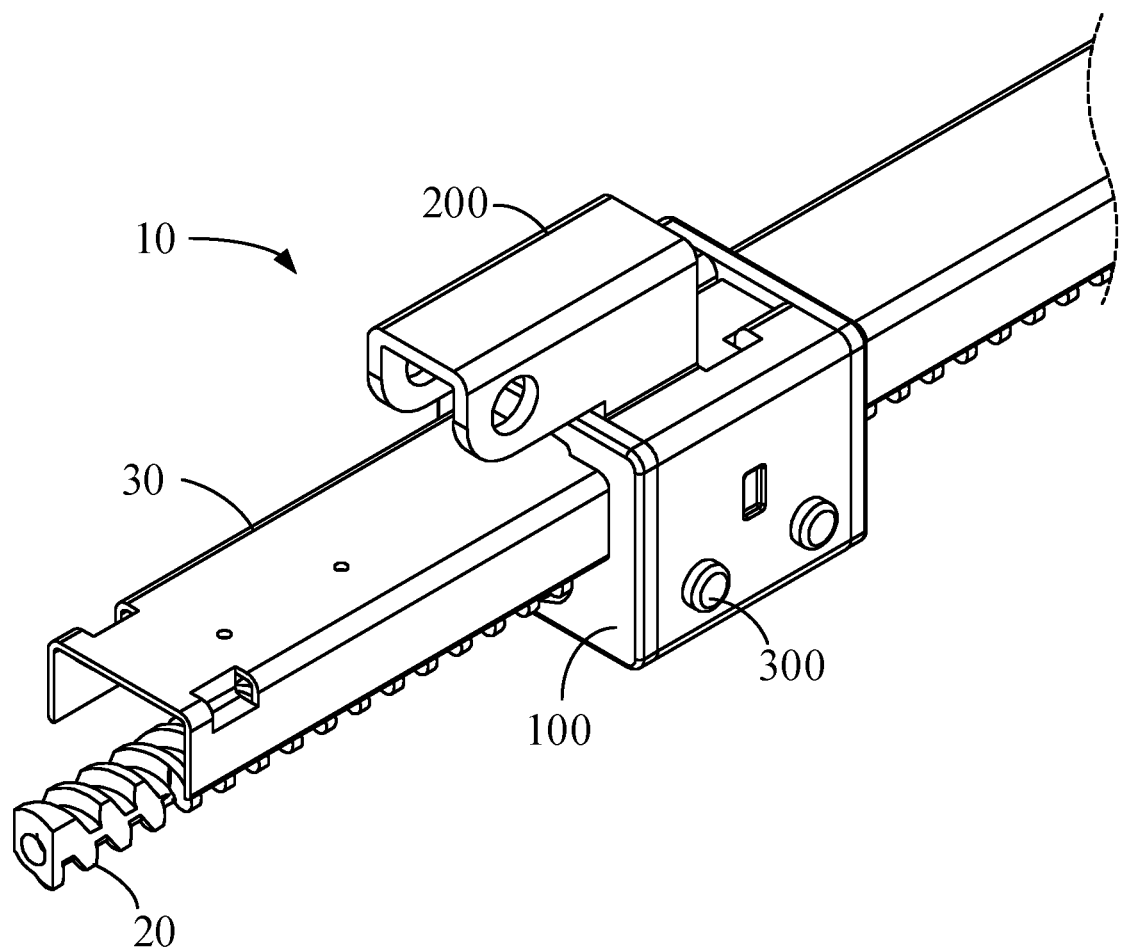
FIG. 2 is a partial structural view of the linear actuator as shown in FIG. 1 in a reverse assembly state.

A number of the first groove 130 and a number of the second groove 140 are two, the two first grooves 130 are disposed intervally in a first diagonal extension direction of the first side plate 103, and the two second grooves 140 are disposed intervally in a second diagonal extension direction of the first side plate 103. For convenience of description, the two first grooves 130 are defined as the first groove 130a and the first groove 130b respectively, the two second grooves 140 are defined as the second groove 140a and the second groove 140b respectively. When the first snap member 410 is inserted into the first groove 130a, the second snap member 420 is inserted into the second groove 140a. A direction of the first snap member 410 to the connecting portion 230 is consistent with a negative direction of the Y-axis, the second snap member 420 is in a similar way, and herein the negative direction of the Y-axis refers to an opposite direction indicated by the Y-axis arrow in FIG. 6. In this case, the changeover unit 200 is in a forward assembly state shown in FIG. 1 and FIG. 3. When the first snap member 410 is inserted into the first groove 130b, the second snap member 420 is inserted into the second groove 140b. The direction of the first snap member 410 to the connecting portion 230 is consistent with a positive direction of the Y-axis, and the second snap member 420 is in a similar way. In this case, the changeover unit 200 is in a reverse assembly state shown in FIG. 2 and FIG. 4. That is, for the driving block 10 of this embodiment, the changeover unit 200 can be assembled either forwardly or reversely, thus the position of the executing mechanism on the Y-axis can be adjusted by changing the mounting direction of the changeover unit 200.

Understandably, of course, in other embodiment, the quantity of the first groove 130 and the second groove 140, the relative position relationship and the setting position on the base 100 can be adjusted according to the actual situation.

Furthermore, referring to FIG. 6 and FIG. 7, the second side plate 104 is provided with a first limit slot 150. The third side plate 105 is provided with a second limit slot 160, and the limit unit 400 also comprises a first stopper 430 and a second stopper 440. The first stopper 430 is connected with the first mounting portion 210, and is inserted in the first limit slot 150. The second stopper 440 is connected with the second mounting portion 220, and is inserted in the second limit slot 160. The matching between the first stopper 430 and the first limit slot 150 and the matching between the second stopper 440 and the second limit slot 160 can restrict the movement of the changeover unit 200 relative to the base 100 in the plane formed by the X and Y axes.

Understandably, in other embodiment, the position of the first limit slot 150 is interchangeable with that of the first stopper 430, and the position of the second limit slot 160 is interchangeable with that of the second stopper 440. In addition, for the combination of the first groove 130 and the second groove 140, as well as the combination of the first limit slot 150 and the second limit slot 160, also can select one of the two combinations.

It is worth mentioning that, in this embodiment, the first snap member 410 and the first stopper 430 are integrated with the first mounting portion 210. The second snap member 420 and the second stopper 440 are integrated with the second mounting portion 220.

In this embodiment, referring to FIG. 6 to FIG. 10, the first mounting portion 210 and the second mounting portion 220 are both bent shaped, in order to improve the load bearing capacity of the changeover unit 200. Specifically, the first mounting portion 210 comprises a first main body 212 and a first bending part 214 which are connected with each other. The first main body 212 is abutted against the second side plate 104, and the first bending part 214 is abutted against the first side plate 103 and connected with the connecting portion 230.

The second mounting portion 220 comprises a second main body 222 and a second bending part 224 which are connected with each other. The second main body 222 is abutted against the third side plate 105, and the second bending part 224 is abutted against the first side plate 103 and connected with the connecting portion 230.

To further restrict the movement of the changeover unit 200 relative to the base 100, the base 100 also comprises a body 170 and two baffles 180, each of which protrudes from a side plate of the body 170. The two baffles 180 are oppositely disposed at both ends of the body 170, and the changeover unit 200 is limited between the two baffles 180. Specific to this embodiment, both of two baffles 180 protrude from the first side plate 103, the second side plate 104 and the third side plate 105. All of the first main body 212 and the first bending part 214, the second main body 222 and the second bending part 224 are located between the two baffles 180. The two baffles 180 further restrict the movement of the first mounting portion 210 and the second mounting portion 220 along the axis of the spindle 20 relative to the base 100.

Furthermore, the forth side plate 106 is provided with a first gap 192 and a second gap 194. The first mounting portion 210 further comprises a third bending part 216, the third bending part 216 is disposed on a side of the first main body 212 away from the first bending part 214, and is inserted in the first gap 192. The assembling arrangement of the first bending part 214 and the third bending part 216 can restrict the movement of the first mounting portion 210 along a z-axis relative to the base 100. The second mounting portion 220 also comprises a forth bending part 226, which is disposed on a side of the second main body 222 away from the second bending part 224, and is inserted in the second gap 194. The assembling arrangement of the second bending part 224 and the forth bending part 226 can restrict the movement of the second mounting portion 220 along the z-axis relative to the base 100.

Understandably, in other embodiment, the first mounting portion 210 and the second mounting portion 220 may also be in other shapes. For example, the first bending part 214 or the third bending part 216 can be omitted, the second bending part 224 or the forth bending part 226 can be omitted, Alternatively, both the first mounting portion 210 and second mounting portion 220 are flat.

When the driving block shown in FIG. 6 and FIG. 7 is assembling, first assemble the changeover unit 200 from top to bottom to the base 100, such that the first snap member 410 is inserted into the first groove 130, the second snap member 420 is inserted into the second groove 140, the first stopper 430 is inserted into the first limit slot 150, and the second stopper 440 is inserted into the second limit slot 160. And then, use the fastener 300 to connect the changeover unit 200 and the base 100.

When the driving block shown in FIG. 11 is assembling, first assemble the first connecting subassembly and the second connecting subassembly respectively on the base 100, and then use the fastener 300 to connect the first connecting subassembly and the base 100, and the second connecting subassembly and the base 100, respectively.

Both the driving block 10 of the embodiment shown in FIG. 6 and the driving block 10 of the embodiment shown in FIG. 11 are convenient and fast to assemble, and the assembled driving block 10 is of high structural stability.

It is worth mentioning that, in the embodiments shown in FIG. 1 and FIG. 3, the changeover unit 200 is symmetrical, the axis of the spindle 20 is located in a symmetrical plane of the changeover unit 200. The changeover unit 200 with symmetrical structure can not only make the driving block 10 more beautiful, but also improve the structural strength of the driving block 10 to improve the bearing capacity of the driving block 10.

Figure 9:
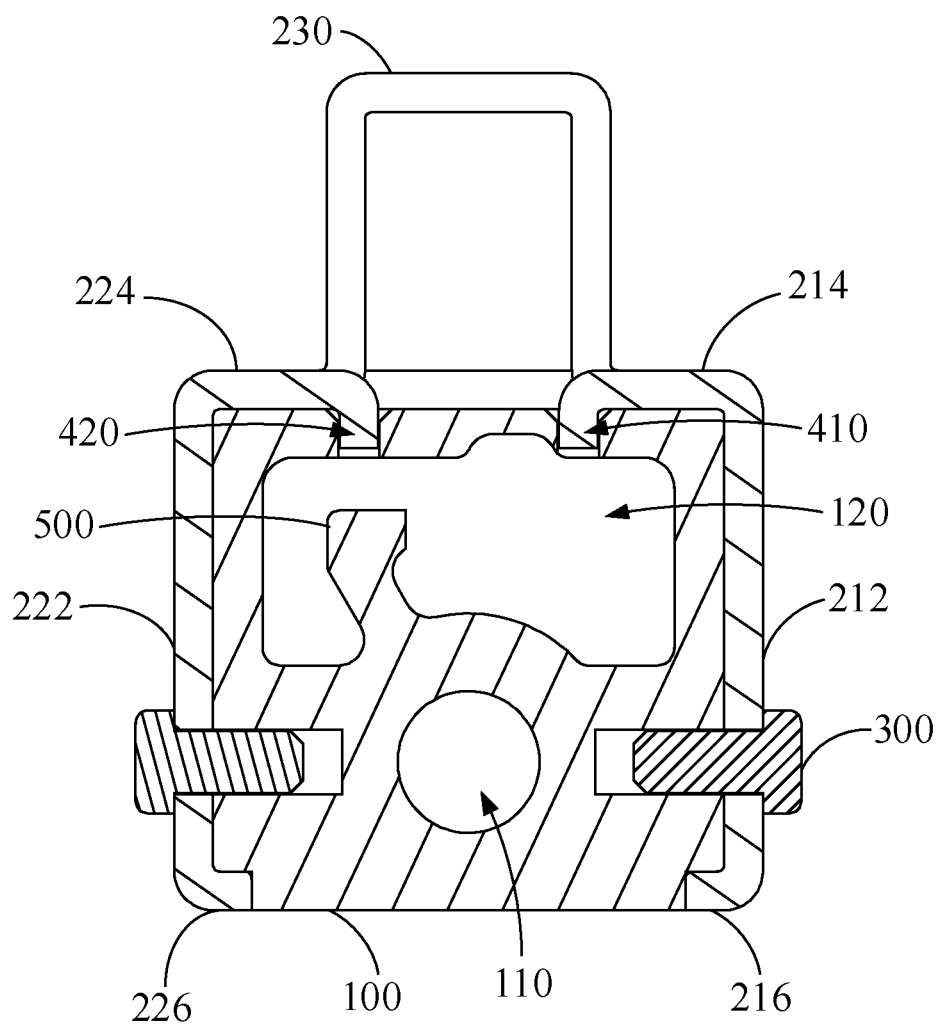
FIG. 9 is a sectional view of the driving block at A-A.

Referring to FIG. 5 and FIG. 9, the driving block 10 also comprises a blocking piece 500. The blocking piece 500 is connected with the base 100, and is accommodated in the plug hole 120. The linear actuator also comprises limit switch, the blocking piece 500 is mainly matched with the limit switch to limit the movement range of the driving block 10, thus determining the stroke of the actuator, then the adjustable range of the actuator and the adjusting apparatus is further limited. Generally, there are two limit switches, and the driving block 10 moves between the two limit switches.

Disclosures above only describe embodiments of the present application, and should not be deemed as limiting the protection scope of the present application. Equivalent structures or procedures made based on the specification and drawings, or applied to alternative associated technical areas directly or indirectly should also fall within the protection scope of the present application.

What is claimed is:

1. A driving block, comprising:
   a base, adapted to be in transmission connection with a spindle;
   a changeover unit, comprising a first mounting portion, a second mounting portion and a connecting portion, the first mounting portion and the second mounting portion disposed on the base and both connected to the connecting portion, the connecting portion being adapted to be engaged with an executing mechanism;
   a fastener, the first mounting portion and the second mounting portion being connected to the base by the fastener; and
   a limit unit, restricting movement of the changeover unit relative to the base.

2. The driving block of claim 1, wherein the connecting portion is an integral structure, and is formed into one-piece respectively with the first mounting portion and the second mounting portion.

3. The driving block of claim 1, wherein the connecting portion comprises a first connecting component and a second connecting component oppositely disposed, the first connecting component and the second connecting component are separately arranged; the first connecting component and the first mounting portion are formed in one-piece, and the second connecting component and the second mounting portion are formed in one-piece.

4. The driving block of claim 1, wherein the connecting portion is provided with a first stepping hole and a second stepping hole, the first stepping hole is oppositely defined to the second stepping hole.

5. The driving block of claim 1, wherein the base comprises a body and two baffles, each of the baffles protrudes from a side of the body, the baffles are oppositely disposed at both ends of the body, and the changeover unit is limited between the two baffles.

6. The driving block of claim 5, wherein the base comprises a first side plate, a second side plate and a third side plate, the second side plate and the third side plate are oppositely disposed at both sides of the first side plate, and the first side plate, the second side plate and the third side plate are all parallel to an axis of the spindle, and both of the two baffles protrude from the first side plate, the second side plate and the third side plate;
   the first mounting portion is bent shaped, and comprises a first main body and a first bending part which are connected with each other, the first main body is abutted against the second side plate, the first bending part is abutted against the first side plate and connected with the connecting portion; the second mounting portion is bent shaped and comprises a second main body and a second bending part which are connected with each other, the second main body is abutted against the third side plate, the second bending part is abutted against the first side plate and connected with the connecting portion; the first main body, the first bending part, the second main body and the second bending part are all located between the two baffles.

7. The driving block of claim 6, wherein the base also comprises a forth side plate disposed opposite the first side plate, the forth side plate is provided with a first gap and a second gap; the first mounting portion further comprises a third bending part, the third bending part is disposed on a side of the first main body away from the first bending part, and is inserted in the first gap; the second mounting portion further comprises a forth bending part, the forth bending part is disposed on a side of the second main body away from the second bending part, and is inserted in the second gap.

8. The driving block of claim 1, wherein the base comprises a first side plate which is parallel to an axis of the spindle, at least one first groove is disposed on the first side plate, the limit unit comprises a first snap member, the first snap member is connected with the first mounting portion and is inserted in the first groove; and
   the first side plate is further provided with at least one second groove, the limit unit further comprises a second snap member, and the second snap member is connected with the second mounting portion and is inserted in the second groove.

9. The driving block of claim 8, wherein the first side plate is rectangular having a first diagonal and a second diagonal intersecting each other, two first grooves are defined and are disposed intervally in an extension direction of the first diagonal; two second grooves are defined and are disposed intervally in an extension direction of the second diagonal; the first snap member and the first mounting portion are formed in one-piece, the second snap member and the second mounting portion are formed in one-piece.

10. The driving block of claim 8, wherein the base further comprises a second side plate and a third side plate, the second side plate and the third side plate are oppositely disposed at both sides of the first side plate, and are parallel to the axis of the spindle; the second side plate is provided with a first limit slot, the limit unit further comprises a first stopper which is connected with the first mounting portion and inserted in the first limit slot; and the third side plate is provided with a second limit slot, the limit unit further comprises a second stopper which is connected with the second mounting portion and inserted in the second limit slot.

11. The driving block of claim 10, wherein the first stopper and the first mounting portion are formed in one-piece, the second stopper and the second mounting portion are formed in one-piece.

12. The driving block of claim 1, wherein the changeover unit is symmetrical, an axis of the spindle is located in a symmetrical plane of the changeover unit; the base is a one-piece structure; a connection hole and a plug hole are defined in the base, the connection hole is provided for the spindle to pass therethrough, the plug hole is provided for a guide rail to pass therethrough; the connection hole is isolated from the plug hole; and the driving block further comprising a blocking piece, the blocking piece is connected with the base and accommodated in the plug hole.

13. A linear actuator, comprising:
a spindle;
a base, adapted to be in transmission connection with a spindle;
a changeover unit, comprising a first mounting portion, a second mounting portion and a connecting portion, wherein the first mounting portion and the second mounting portion are disposed on the base and both connected to the connecting portion, and the connecting portion is adapted to be engaged with an executing mechanism;
a fastener, the first mounting portion and the second mounting portion being connected to the base by the fastener; and
a limit unit, restricting movement of the changeover unit relative to the base.

14. The linear actuator of claim 13, wherein the connecting portion is an integral structure, and is formed into one-piece respectively with the first mounting portion and the second mounting portion.

15. The linear actuator of claim 13, wherein the connecting portion comprises a first connecting component and a second connecting component oppositely disposed, the first connecting component and the second connecting component are separately arranged; the first connecting component and the first mounting portion are formed in one-piece, and the second connecting component and the second mounting portion are formed in one-piece.

16. The linear actuator of claim 13, wherein the connecting portion is provided with a first stepping hole and a second stepping hole, the first stepping hole is oppositely defined to the second stepping hole; the base comprises a body and two baffles, the baffle protrudes from a side of the body, the baffles are oppositely disposed at both ends of the body, and the changeover unit is limited between the two baffles.

17. An adjusting apparatus, comprising an executing mechanism and a linear actuator, the linear actuator comprising:
a spindle;
a base, in transmission connection with a spindle;
a changeover unit, comprising a first mounting portion, a second mounting portion and a connecting portion, the first mounting portion and the second mounting portion disposed on the base and both connected to the connecting portion, the connecting portion being engaged with the executing mechanism;
a fastener, the first mounting portion and the second mounting portion being connected to the base by the fastener; and
a limit unit, restricting movement of the changeover unit relative to the base.

18. The adjusting apparatus of claim 17, wherein the connecting portion is an integral structure, and is formed into one-piece respectively with the first mounting portion and the second mounting portion.

19. The adjusting apparatus of claim 17, wherein the connecting portion comprises a first connecting component and a second connecting component oppositely disposed, the first connecting component and the second connecting component are separately arranged; the first connecting component and the first mounting portion are formed in one-piece, and the second connecting component and the second mounting portion are formed in one-piece.

20. The adjusting apparatus of claim 17, wherein the connecting portion is provided with a first stepping hole and a second stepping hole, the first stepping hole is oppositely defined to the second stepping hole; the base comprises a body and two baffles, each of the baffles protrudes from a side of the body, the baffles are oppositely disposed at both ends of the body, and the changeover unit is limited between the two baffles.

* * * * *